Feb. 1, 1938.  R. HINKLE  2,106,742

SIFTING DEVICE

Filed Jan. 18, 1936  2 Sheets-Sheet 1

Inventor
Raymond Hinkle.
Raymond Jones.

By

Attorney

Feb. 1, 1938.                R. HINKLE                 2,106,742
                          SIFTING DEVICE
                      Filed Jan. 18, 1936            2 Sheets-Sheet 2
Fig. 3.
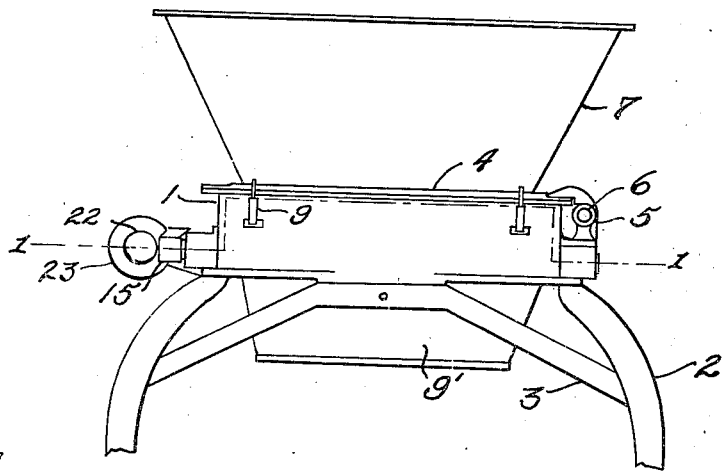
Fig. 4.        Fig. 5.
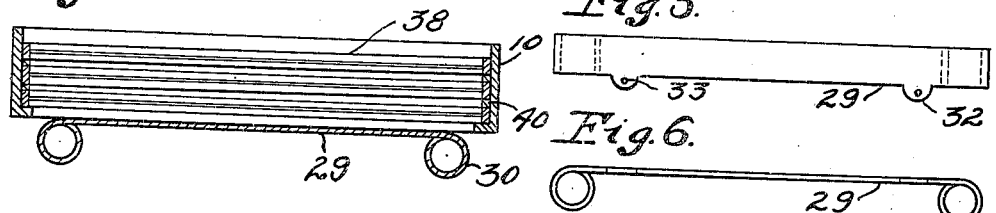
Fig. 6.
Fig. 7.
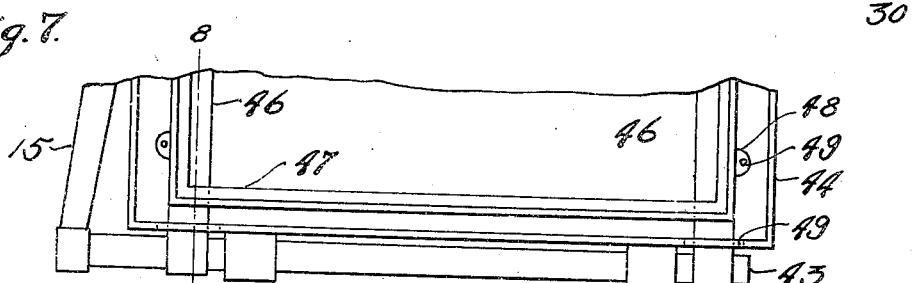
Fig. 8.
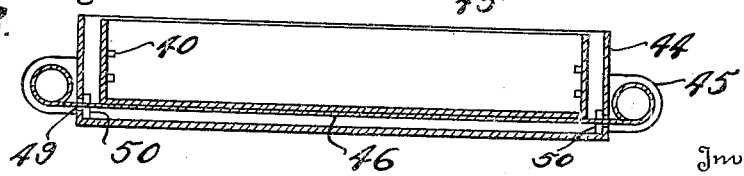
Inventor
Raymond Hinkle.
By Raymond Jones.
Attorney Patented Feb. 1, 1938

2,106,742

UNITED STATES PATENT OFFICE 2,106,742

SIFTING DEVICE

Raymond Hinkle, Hanover, Pa.

Application January 18, 1936, Serial No. 59,777

5 Claims. (Cl. 209—244)

My invention relates to improvements in sifting devices, and more particularly to a sifting device of the reciprocating type and has for its main object to provide a sifter of the portable type that is relatively small and light in weight but so constructed as to render it highly efficient from the standpoint of quality and quantity of output.

Another object is to provide a sifter that is adapted to be operated at high speeds in a manner to handle a maximum quantity of material in a minimum of time.

Another object is to provide a sifter that is rugged in construction and relatively free of material wear of various parts thereof to the end of obtaining a maximum period of useful service.

A further object is to provide a sifter that is easily assembled and operated, and wherein the sifting elements may be quickly removed as a unit or singly to provide for repair or cleaning of such elements.

Other objects and new results will become obvious from the following detailed description of a preferred form of the device in accordance with the accompanying drawings, wherein—

Fig. 3 is a view in side elevation of an assembled unit;

Fig. 4 is a transverse view in section of a sieve box and support therefor;

Figs. 5 and 6 are plan and side views, respectively, of a sieve box support;

Fig. 7 is a fragmentary plan view of a modified form of sieve box support; and

Fig. 8 is a view in section on line 8—8 of Fig. 7.

Figure 2:
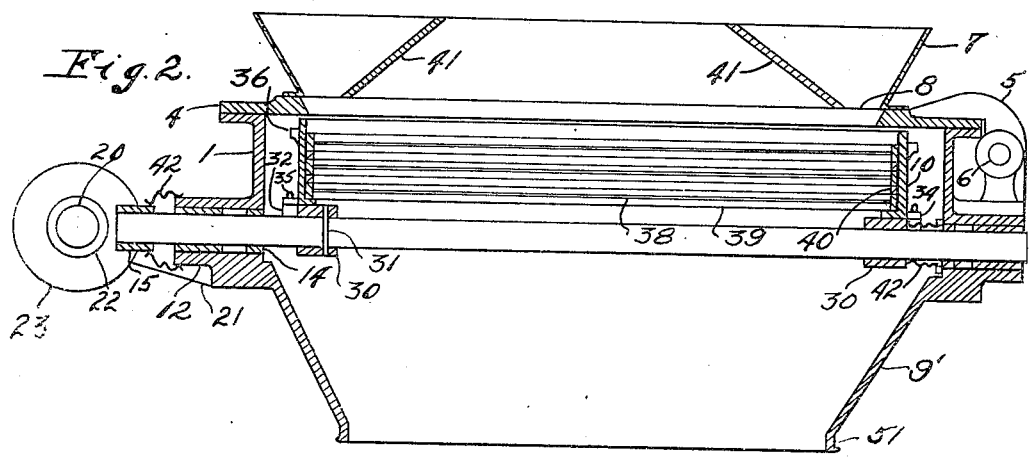
Fig. 2 is a vertical sectional view along a plane which passes through the line 2—2 of Fig. 1.

Referring to Fig. 3, the main casing 1, within which the sifting unit is mounted, is supported by legs 2 to which are secured brace members 3. The upper open end of the casing 1 is provided with a cover plate 4 which is secured to the casing by hinges 5 in a manner to permit the cover plate to swing to an open position around pivot points 6. A feed hopper 7 is secured to the plate 4 in a manner to discharge material through a central feed opening 8 in the plate 4 as best shown in Fig. 2. A plurality of detents or locks 9 are pivoted to the casing 1 and are arranged to engage over the side edges of the plate 4 to retain same in a closed position. A material delivery chute 9' extends from the lower end of casing 1.

Figure 1:
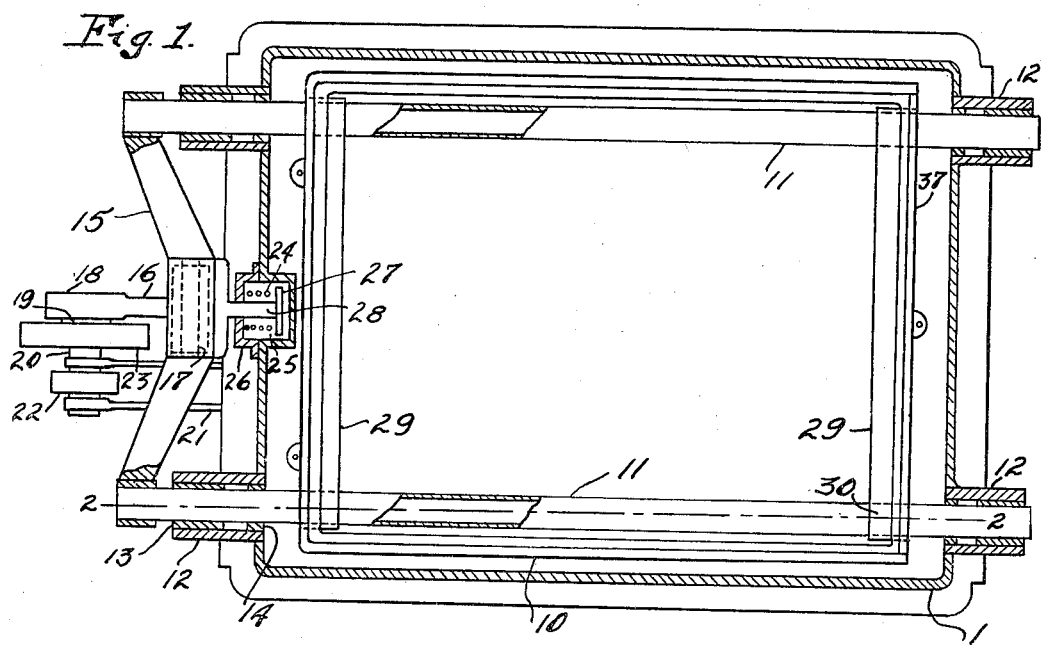
Figure 1 is a transverse part sectional view on line 1—1 of Fig. 3 with the sifting elements removed to better show other parts.

As best shown in Figs. 1 and 2, a sieve box 10 is arranged within the casing 1 and is detachably supported upon a pair of tubular members 11 that, in turn, are mounted to reciprocate on and within the casing 1. Each member 11 is carried at opposite ends thereof in bearings 12 preferably cast integrally with the casing 1. Each bearing 12 is provided with a bushing 13 of the self-lubricated type and packing members 14 are arranged to prevent access of dust to these bushings.

A driving yoke 15 is secured to corresponding ends of members 11. The yoke 15 is reciprocated by means of a rod 16 pivoted at one end by a cross pin 17 to the yoke 15 and secured at its other end to an eccentric strap 18 on the eccentric cam 19. A pulley shaft 20 supported in brackets 21 carries a driving pulley 22, a flywheel 23 and the eccentric cam 19. A cushioning spring 24 is provided within a recess 25 formed in casing 1, which recess is closed by a cap 26 and against which the spring 24 may bear. The other end of this spring engages a plate 27 carried by a rod 28 which extends from the yoke 15.

The tubular members 11 are cross-connected and braced by a pair of cross bars 29, each of which is bent or formed at its ends to provide sleeve portions 30 which are adapted to engage around the respective tubular member and are secured thereto preferably by pins or bolts 31. The bars 29 serve the double purpose of connecting and bracing the members 11 as well as providing a support for the sieve box 10. As shown in Fig. 5, lugs 32 are formed on the bars 29 and are provided each with an opening 33. A corresponding series of lugs 34 is formed on the ends of box 10. When the box 10 is properly positioned with the lugs 32 and 34 in contact, the holes in adjacent lugs are in registry. A pin 35 is engaged within these pairs of aligned holes in a manner to secure the box 10 firmly upon the bars 29. To remove the box, it is necessary merely to remove these pins.

The box 10 is provided with hand grip extensions 36. One end 37 of the box is preferably arranged to be readily removable in a manner to permit endwise removal of any screen element supported within this box. The removable box end may be detachably secured in place as by screws or the like. Within the sieve box 10 are supported, in superimposed relation, a series of mesh sieve elements 38, each carried in a respective frame 39 suitably supported on guide members 40. A pair of fixed baffle plates 41 is arranged within the hopper 7 for the purpose of providing a gradual feed of material from the hopper to the sieve box in a manner to prevent excess accumulation of material above the upper sieve. Elements in the form of sleeves or boots 42 are provided to shield the bearings from dust.

A modified form of sieve box support is shown in Figs. 7 and 8 wherein the tubular members 43 are arranged and supported outside of a main casing 44 to reciprocate in bearings 45 secured to casing 44. Cross bars 46 extend between the members 43 to provide a cradle support for the sieve box 47. The box may be detachably secured to the bars by means of lugs 48 and pins 49 as shown in the form of Fig. 1. The bars 46 extend through slots 49 formed in opposite sides of the box 47 and these slots may be closed by a flexible gasket or by means of lugs 50 secured to the bars in position to close the slots to prevent passage of material dust to the outside. By arranging members 43 without the casing 44, it is possible to reduce the vertical extent of this casing as compared to the form shown in Fig. 2.

In the operation of the sifting device, material to be sifted is dumped into the hopper 7 and is diverted by the baffle plates 41 onto the upper sieve screen 38. The mesh of the screens 38 is graduated as to size of openings therein so that the screens from top to bottom are reduced in size of mesh towards the bottom of the stack in a manner to provide a maximum speed in the sifting operation. The tubular members 11 are reciprocated in a horizontal plane by means of the eccentric 19 and rod 16 whereby a similar motion is imparted to the box 10. The sifted material is finally discharged from the chute 9', the end of which is provided with a flange 51 to which, if desired, a receiving sack may be secured or the discharge may be made into a barrel or like container positioned below the chute. In order to gain access to the box 10, the cover plate 4 is opened. The box may be removed vertically as a unit with the series of sieves therein to afford access to the various sieve elements. If the sieve elements are carried on guides 40, they may be slid thereon as desired and removed singly after removal of the box end 37. If the guides 40 are dispensed with, the screens may be removed upwardly out of the box 10. Such removal is necessary to provide for cleaning or repair of the various screens.

The device disclosed is adapted to handle and sift many and various forms of material such as flour, meal, sugar and salt or other material used in the production of bakery articles, although the device may be used with equal efficiency in any art where it is desired to secure a sifted dry material of extreme fineness. The sifter unit is adapted to be driven at relatively high speeds in the order of 2400 strokes per minute and the length of the stroke is relatively small. For this reason, the dimensions of the main casing may be made relatively small with a corresponding reduction in overall size and weight.

While a preferred form of the invention is disclosed in a manner to explain its construction and operation, it is intended that modifications thereof are contemplated such as will be embraced within the scope of the appended claims.

I claim:

1. A sifting device comprising a rectangular casing, a pair of support rods, bearings associated with the casing within which said rods are arranged to reciprocate, means for reciprocating said rods, a pair of spaced cross bars interconnecting said supports, a rectangular sieve box detachably connected at opposite ends thereof to said cross bars, a series of sieves supported within said box, a cover removably supported on the upper open end of said casing, a feed hopper secured to said cover, said box and sieves being removable as a unit upwardly from said casing after removal of said cover.

2. In a sifting device as set forth in claim 1, wherein lugs are provided on the box, corresponding lugs being provided on the cross bars, and means to detachably secure adjacent corresponding lugs together to position said box.

3. In a device as set forth in claim 1, a pair of baffle plates secured to and within said hopper each plate being disposed at an angle to a respective side of the hopper to control delivery of material from the hopper the lower ends of said plates being positioned to deliver material to opposite ends of the sieve box.

4. In a sifting device as set forth in claim 1, each end of a cross bar being formed to provide a sleeve portion, said supports being positioned within the respective sleeve portions.

5. A sifting device comprising a casing, a pair of bearings provided at each end of said casing, a pair of supporting bars slidably arranged within said bearings, a yoke connected to said bars, means for reciprocating said yoke, a sieve box detachably secured to said bars and having an open upper side, a plurality of sieves detachably supported in said box in superimposed positions, a cover plate removably secured to the upper open side of the casing and being provided with a feed opening therethrough, a feed hopper secured to said box and sieves being removable as a unit from the casing upon displacement of the cover plate said plate in registry with said opening.

RAYMOND HINKLE.